United States Patent Office.

MYER M. KANN, OF HULTON, ASSIGNOR TO THE PITTSBURGH CRUSHED STEEL COMPANY, LIMITED, OF PITTSBURG, PENNSYLVANIA.

POLISHING MATERIAL AND PROCESS OF MAKING SAME.

SPECIFICATION forming part of Letters Patent No. 552,712, dated January 7, 1896.

Application filed February 3, 1894. Serial No. 499,008. (No specimens.)

*To all whom it may concern:*

Be it known that I, MYER M. KANN, of Hulton, in the county of Allegheny and State of Pennsylvania, have invented a new and useful Improvement in Polishing Material, of which the following is a full, clear, and exact description.

My invention relates to an improvement in rouge for polishing glass, &c., and in the method of making the same, and it is based upon two discoveries which I have made, viz: first, that an improved rouge may be made by treating metal, preferably iron or steel, with sal-ammoniac and water, which have the effect of converting the metal directly into an insoluble oxide or salt which can be brought into condition for commercial use by pulverizing or bolting, or otherwise, for by such process the non-metallic constituents are preserved and are rendered useful as parts of the polishing material; second, that the best material for the manufacture of rouge is steel, preferably crushed steel, or steel which has been reduced to small particles. These particles are made by heating the steel to a high temperature, then quenching it in water or otherwise chilling it suddenly, bringing it thereby to a crystalline state, and then reducing it to fine particles or grains by crushing. The particles thus produced are treated with sal-ammoniac and water, as hereinafter described, though I do not limit my invention to the employment of the steel in crushed form.

In the practice of my invention I take the iron or steel (preferably the crushed steel particles above mentioned) in as fine state of subdivision as possible and add to it sal-ammoniac in sufficient quantity to combine with all the iron. For this purpose twelve to fifteen parts, by weight, of sal-ammoniac added to one hundred parts, by weight, of iron or steel will suffice. Water—say about two gallons—is added to this mixture, and chemical reaction between the iron or steel and the sal-ammoniac immediately ensues with the evolution of heat. As the water evaporates more may be added, and the mass stirred until the iron has completely combined with the sal-ammoniac. The material when dry may then be ground, or otherwise separated into grades, bolted and calcined at a red heat, so as to bring it into a state of fine subdivision for use as a polishing material. The reactions taking place during the operation are probably as follows:

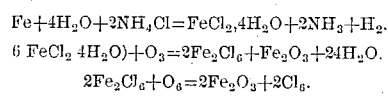

$$Fe + 4H_2O + 2NH_4Cl = FeCl_2, 4H_2O + 2NH_3 + H_2.$$
$$6\,FeCl_2, 4H_2O) + O_3 = 2Fe_2Cl_6 + Fe_2O_3 + 24H_2O.$$
$$2Fe_2Cl_6 + O_3 = 2Fe_2O_3 + 2Cl_6.$$

The material so made is of excellent quality. It is comparatively cheap, it is easy to make, and may be used with advantage for polishing glass, metals, and for other purposes in the arts where rouge is commonly employed. The best and finest rouge is produced when crushed steel is taken as the material treated by the sal-ammoniac. The rouge which is made by treating steel or iron with sal-ammoniac and water has a peculiar brown color and is an oxide of iron containing the impurities of the metallic iron, the article being magnetic in character. It is easily distinguishable in appearance from the ordinary commercial rouge and is of superior quality.

An analysis of the product gives the following composition: Ferric oxide, 95.90 per cent.; moisture, 1.25 per cent.; ferrico ammonic chloride, 0.80 per cent.; silica, 0.77 per cent.; carbon, 0.47 per cent.

The oxide produced by treating metal by sal-ammoniac and water may be used for such purposes other than for polishing for which it may be adapted.

I claim—

1. An improvement in the manufacture of polishing material, which consists in mixing metallic iron or steel with sal ammoniac and water, and adding more water as the reactions proceed and until they cease, producing a fine powder; substantially as described.

2. An improvement in the manufacture of polishing material, which consists in mixing metallic iron or steel with sal ammoniac and water, stirring the mixture, and adding water until all reaction ceases, producing a fine powder; substantially as described.

3. An improvement in the manufacture of polishing material, which consists in mixing metallic iron or steel with sal ammoniac and water, adding water until all reaction ceases, producing a powder, and then grinding the powder; substantially as described.

4. As a new article of manufacture, a polishing rouge composed of an oxide of iron mixed with the carbon, silica, &c., which were present in the metallic iron or steel from which it is made, said rouge being of a brown color and magnetic in character, substantially as described.

In testimony whereof I have hereunto set my hand.

MYER M. KANN.

Witnesses:
  W. B. CORWIN,
  H. M. CORWIN.